Jan. 16, 1951 G. A. HARRINGTON 2,538,452
SOUND RECORDING AND REPRODUCING MACHINE
Filed Dec. 31, 1945 9 Sheets-Sheet 1

Inventor.
GERARD A. HARRINGTON.
By Howard J. Whelan
Attorney

Jan. 16, 1951 G. A. HARRINGTON 2,538,452
SOUND RECORDING AND REPRODUCING MACHINE
Filed Dec. 31, 1945 9 Sheets-Sheet 6

Inventor
GERARD A. HARRINGTON.
By Howard J. Whelan.
Attorney

Jan. 16, 1951        G. A. HARRINGTON        2,538,452
SOUND RECORDING AND REPRODUCING MACHINE
Filed Dec. 31, 1945        9 Sheets-Sheet 7
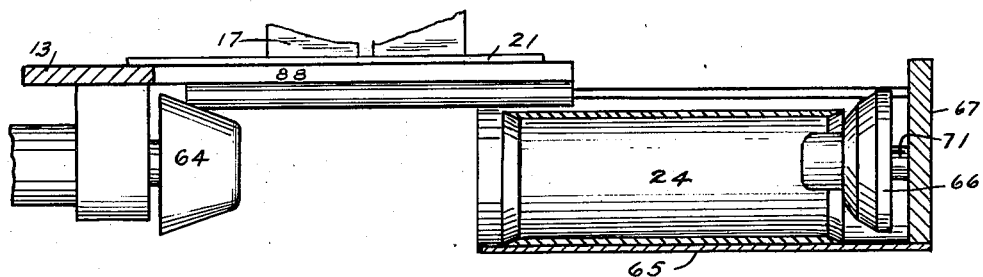
FIG. 7.
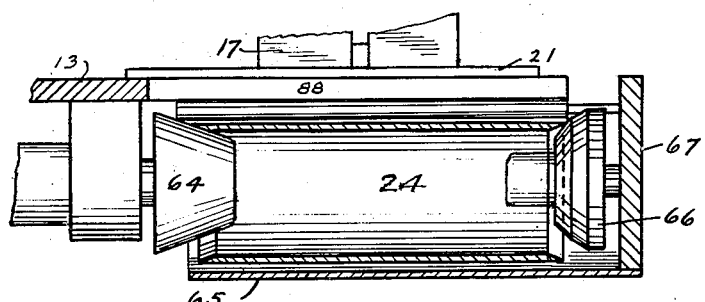
FIG. 8.
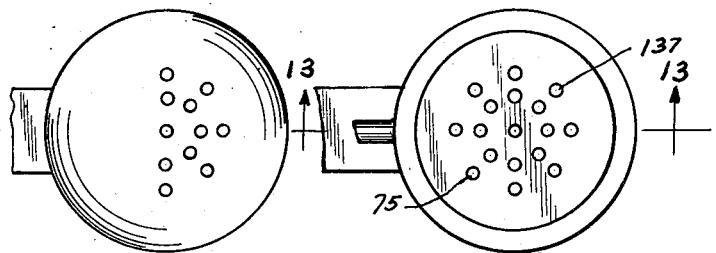 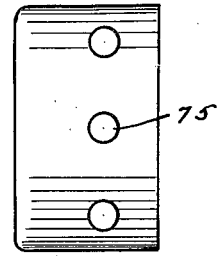
FIG. 12.    FIG. 10.       FIG. 11.
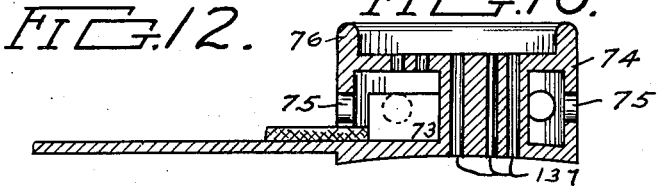
FIG. 13.
Inventor
GERARD A. HARRINGTON.
By Howard J. Whelan.
Attorney

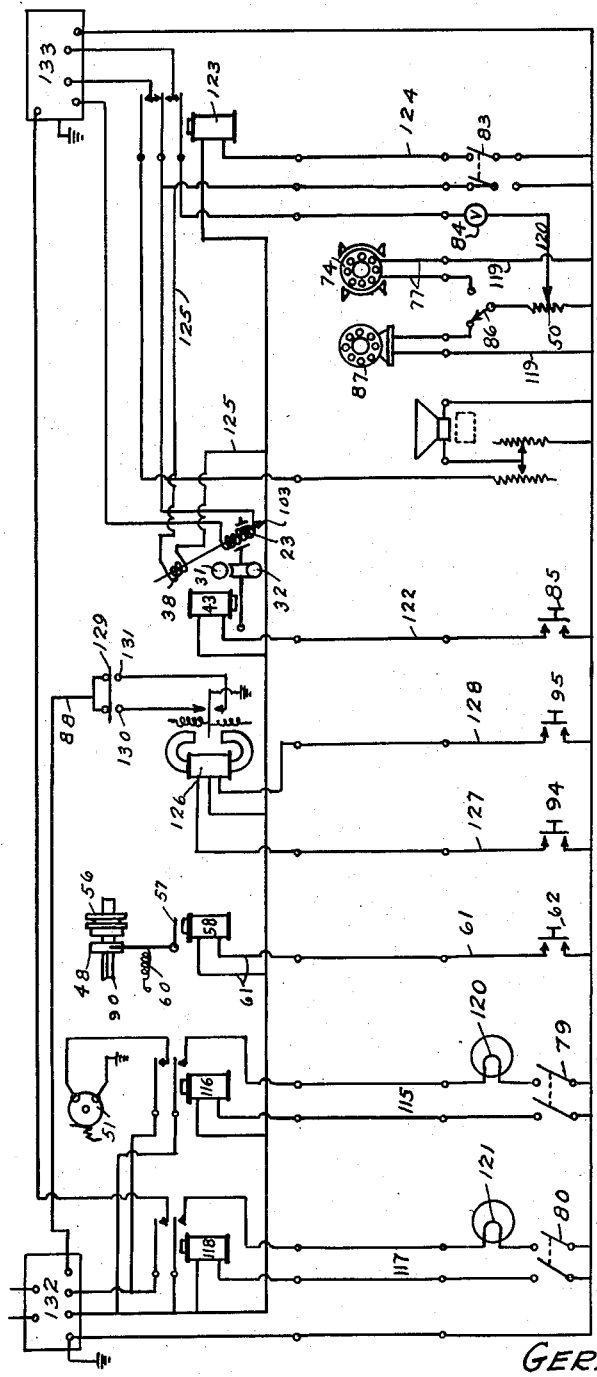

Jan. 16, 1951 G. A. HARRINGTON 2,538,452
SOUND RECORDING AND REPRODUCING MACHINE
Filed Dec. 31, 1945 9 Sheets-Sheet 9

Inventor
GERARD A. HARRINGTON.
By Howard J. Whelan.
Attorney

Patented Jan. 16, 1951

2,538,452

UNITED STATES PATENT OFFICE 2,538,452

SOUND RECORDING AND REPRODUCING MACHINE

Gerard A. Harrington, Baltimore, Md.

Application December 31, 1945, Serial No. 638,576

12 Claims. (Cl. 179—100.4)

This invention relates to mechanical phonographic equipment and more particularly to those classes of devices used for recording speech or dictation, spoken directly into them, and in a general way includes such structures as set forth in applicant's copending application in the United States Patent Office, Serial Number 527,561, filed March 22, 1944, now Patent No. 2,391,897, issued Jan. 1, 1946.

In the particular forms of this type of equipment, at present in use, a hollow cylinder is used for recording the message and is of cylindrical shape and manually slipped on the peripheral surface of a metal platen until it is properly located thereon and becomes wedged or locked in place. The recording cylinder is exposed and more or less unprotected. Also the arrangements made for play-back are complicated and apply the cutting stylus with the same force as that used for cutting the cylinder during the recording. This is detrimental to the recording cylinder. The disadvantage of this type is that it requires manipulation by the user in a manner that is uncertain and slow, and is apt to cause injury to the equipment with results that are not satisfactory.

An object of this invention is to provide a new and improved dictating machine that will avoid one or more of the disadvantages and limitations of the prior art.

A further object of the present invention is to provide a new and improved dictating machine that will permit recording cylinders to be placed in the machine with a relatively small amount of effort and will automatically align them in position on the equipment, for conventional use thereon.

Another object of the present invention is to provide a new and improved dictating machine that will enable playbacks to be made with less pressure on the cylinder than used for recording, so as not to disturb or injure the original grooving made in cutting the impressions, resulting from dictation.

Still another object of the invention is to provide a new and improved dictating machine that will afford a prompt change from recording to reproducing or vice-versa, and be at the complete control of the user in a very convenient and effortless manner.

A still further object of the present invention is to provide a new and improved dictating machine that can employ recording cylinders or sheet recording material without requiring a supporting platen.

An additional object of the invention is to provide a new and improved dictating machine that will have a protecting shield about its recording cylinder or material to make same relatively unexposed to mechanical injury from an external source.

Other objects of this invention are to provide a new and improved dictating machine that will amplify the incoming and outgoing signals.

A further object of this invention is to provide a weighted cutting head with weight lifting means for playback, to reduce the needle pressure on the record.

A further object of the invention is to provide a plastic recording medium capable of having its recordings removed without scraping or shaving.

A further object of the device is to record incoming telephone calls and the responses made thereto.

Other objects will become apparent as the invention is more fully set forth.

For a better understanding of the invention and for other objects thereof reference is made to the appended drawings and following description outling a form of the invention by way of illustration, while the scope of the invention is pointed out particularly in the claims.

Referring to the drawings:

Figure 7 is a view similar to Figure 4, but with the trough pulled out and the cylinder in its first position;

Figure 8 is a view similar to Figure 7 with the trough partly closed and cylinder partly in place;

Figure 9 is a diagrammatic wiring diagram;

Figure 10 is a plan view of the ear piece;

Figure 11 is a side elevation of Figure 10;

Figure 12 is a view of the under side which is placed against the ear of the user;

Figure 13 is a sectional view taken along line 13—13 of Figure 10;

Similar reference characters refer to similar parts throughout the drawings.

Figure 1:
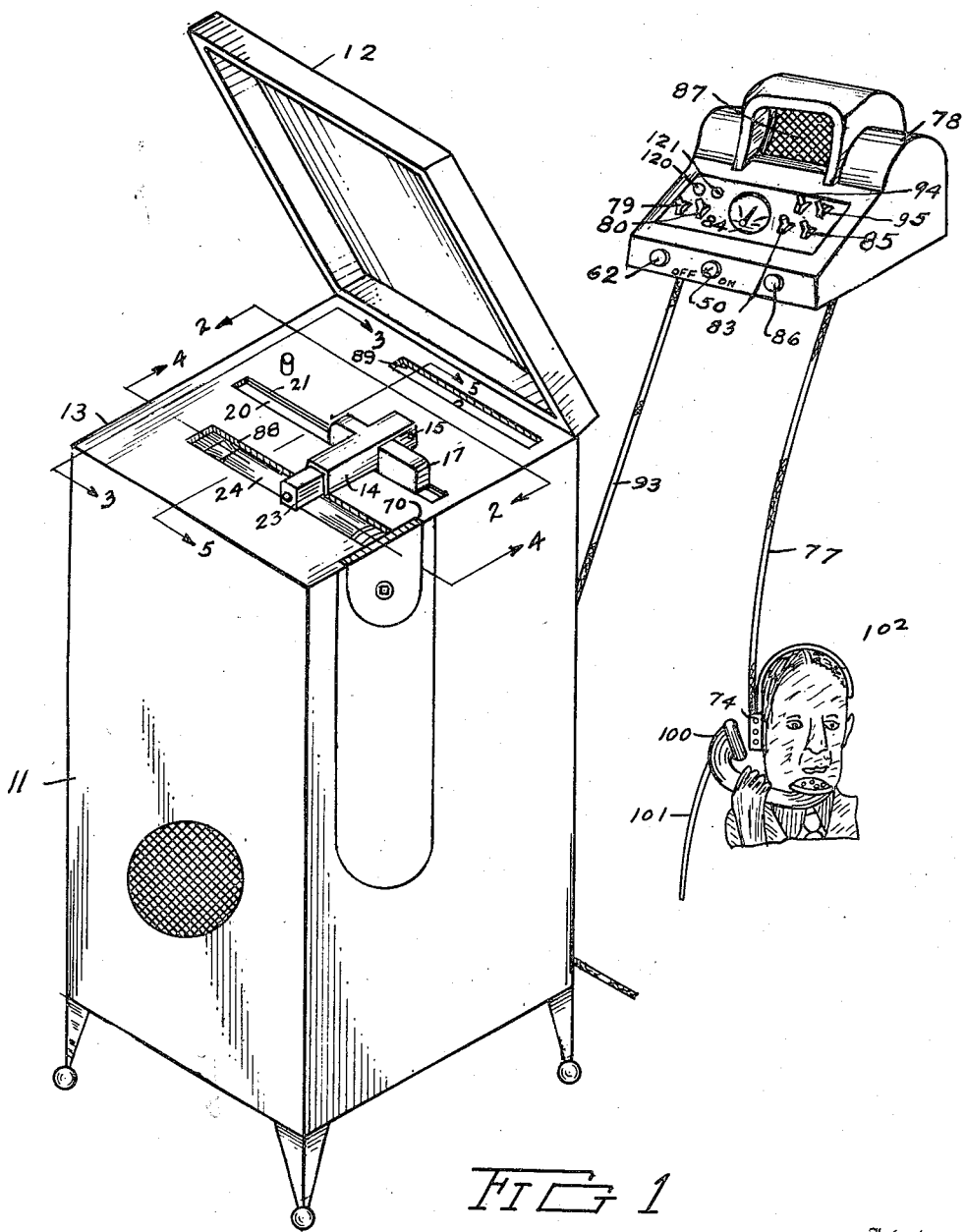
Figure 1 is a view in perspective showing the recording and reproducing device, the control panel and microphone, and two-way telephone conversation pick-up.
Figure 2:
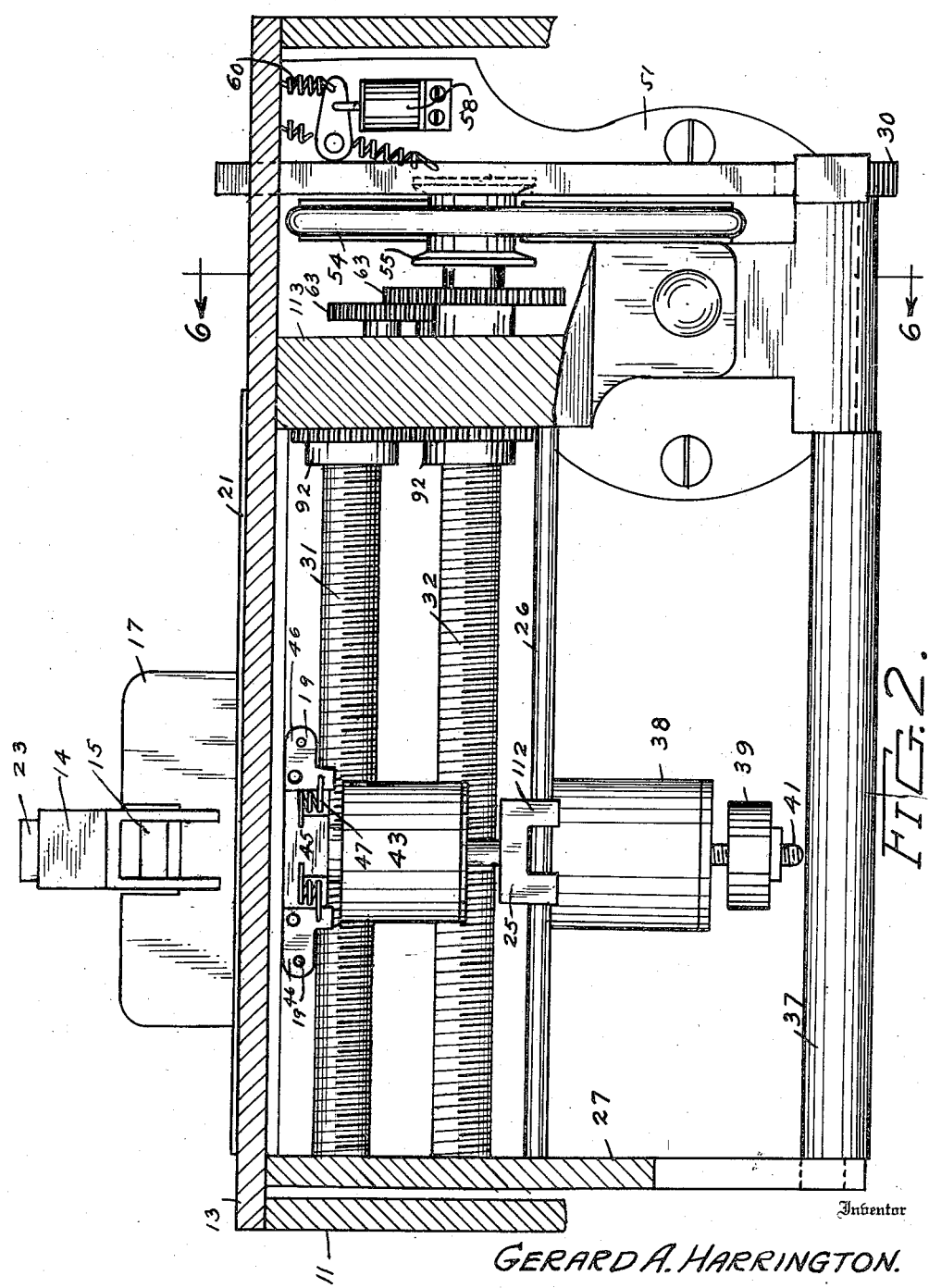
Figure 2 is a sectional view taken along line 2—2 of Figure 1.
Figure 3:
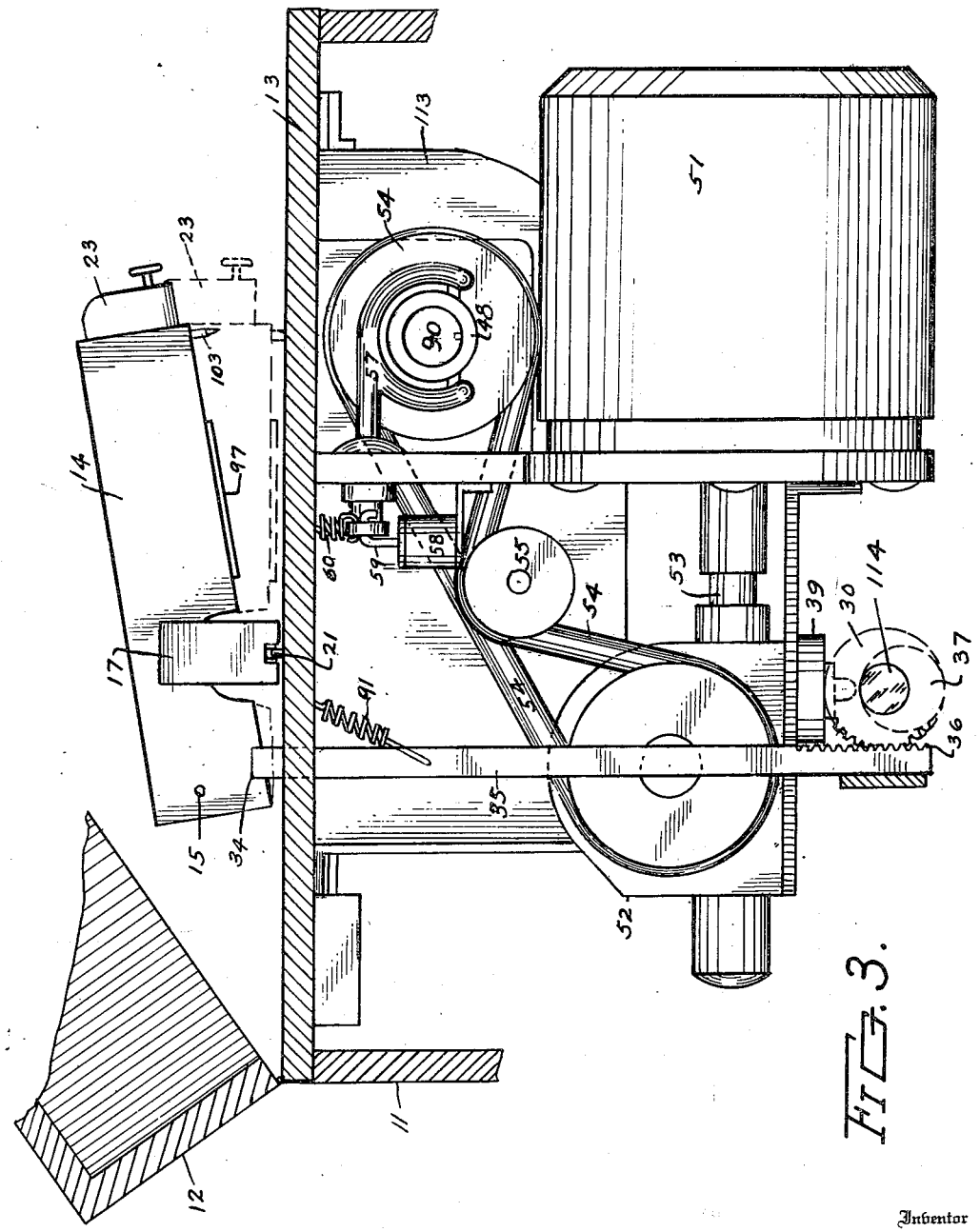
Figure 3 is a sectional view taken along line 3—3 of Figure 1.
Figure 4:
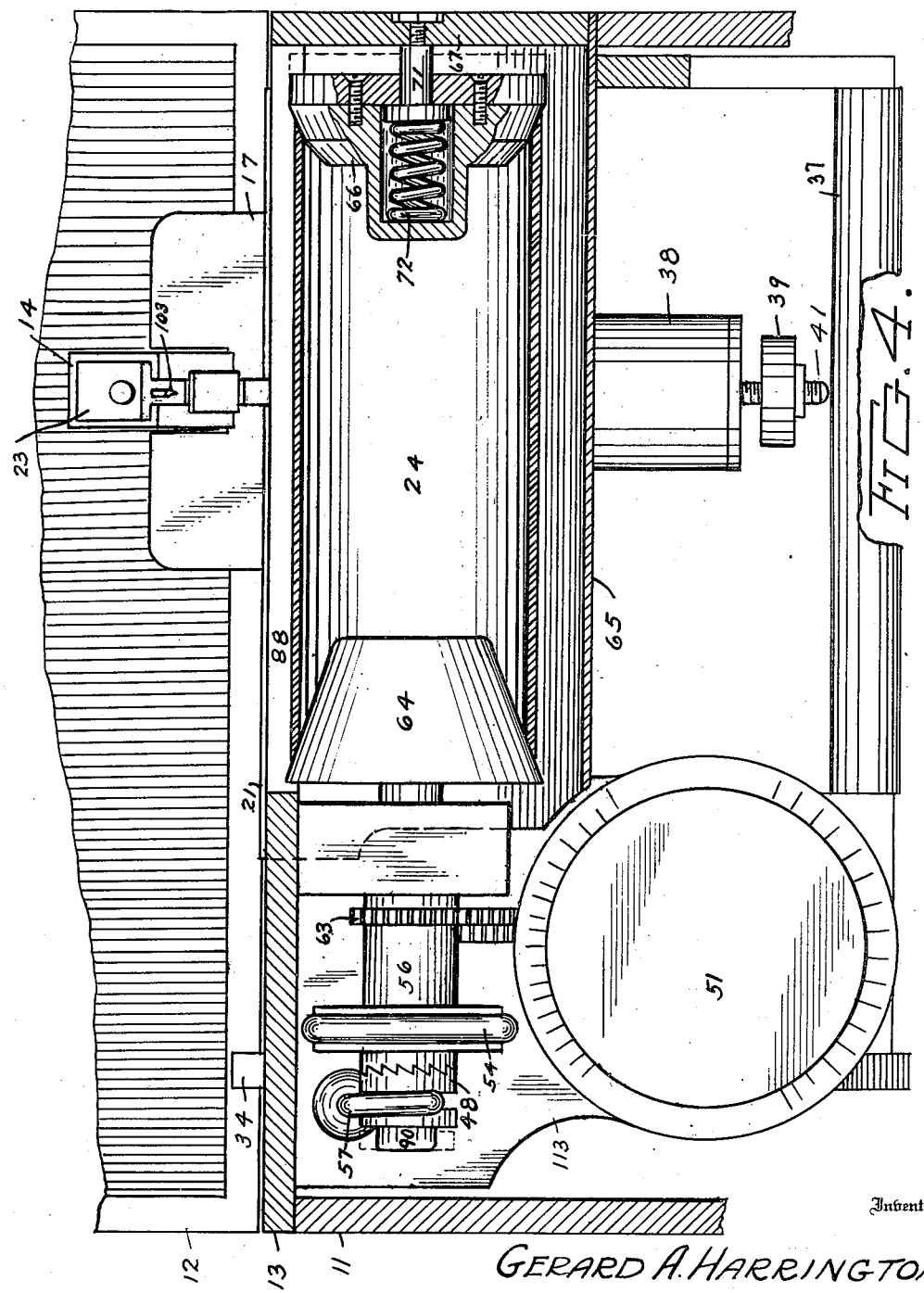
Figure 4 is a sectional view taken along line 4—4 of Figure 1 showing the recording cylinder in recording position.
Figure 5:
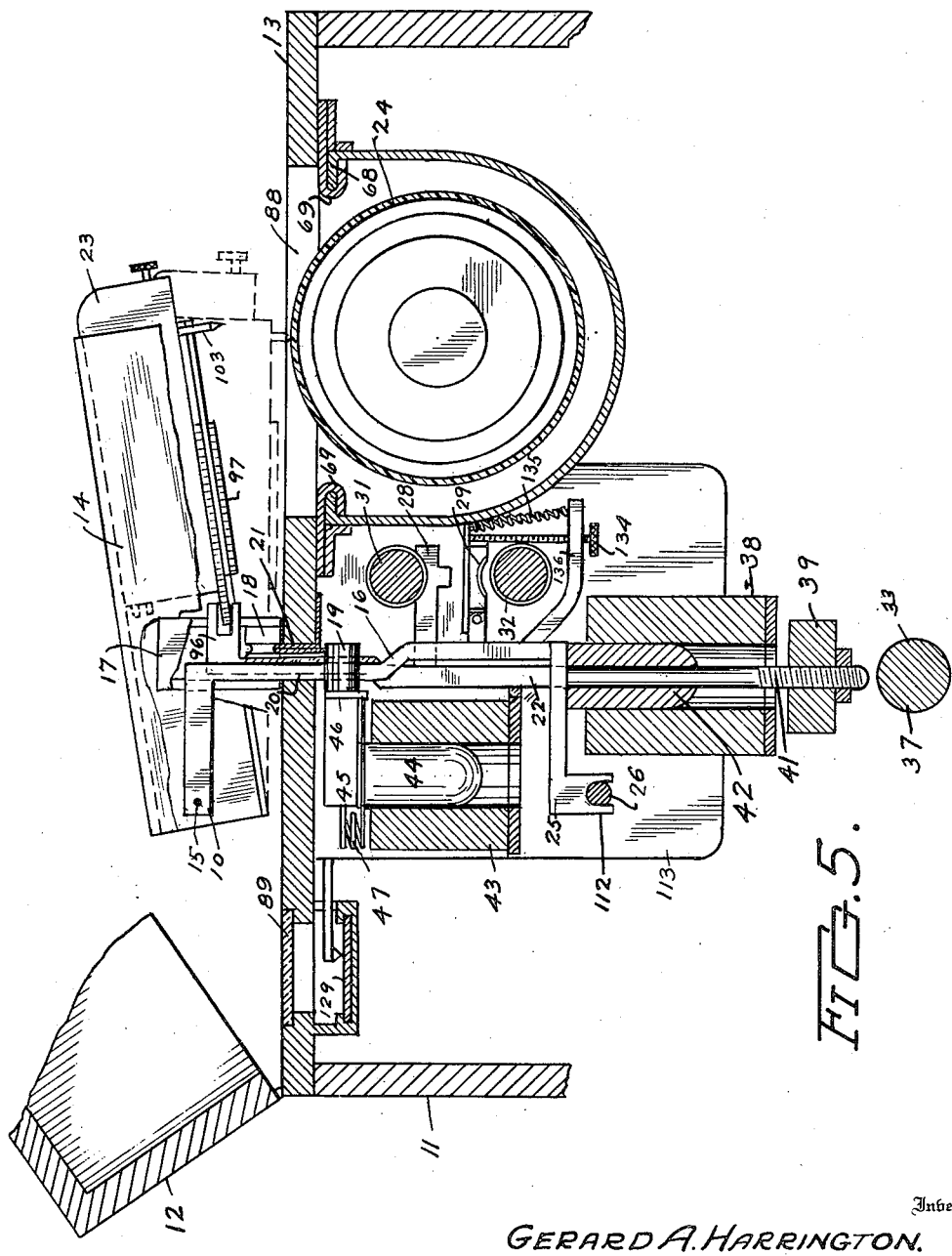
Figure 5 is a sectional view taken along line 5—5 of Figure 1.
Figure 6:
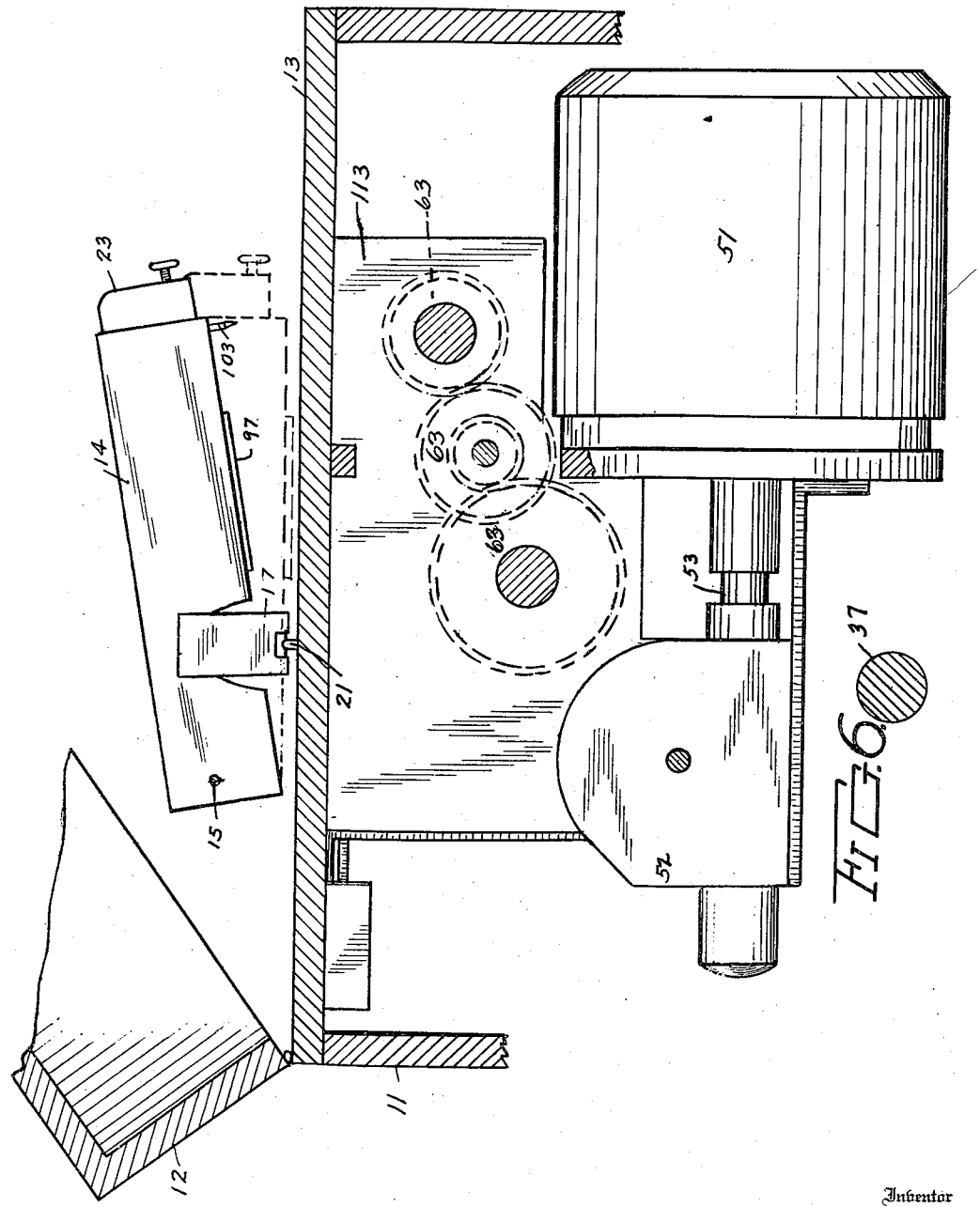
Figure 6 is a sectional view taken along line 6—6 of Figure 2.

Referring particularly to Figures 1 and 5, a cabinet 11 includes the general working and recording parts of a dictating machine. Its cover 12 is hingedly raised in order to portray the general layout of the visible recording mechanism showing above the table 13 recessed in close to the top of the cabinet. This mechanism includes a horizontal recording lever 14 pivoted adjacent its rear end on pivots 15, and tilts through an arcuate path at its front end where a conventional recording stylus unit 23 is placed and held. The lever is formed with a rectangular cross section having relatively thin walls and hollowed out to receive various operating parts that will be later described. The pivots 15 extend from a horizontal bracket 10 forming the head of a traveller 16. The traveller is coupled to a carriage 17 which fits about it above the table 13 and is carried by it from one side of the table 13 to the other in a slot 20. The carriage has upper and lower flanged rollers 18 and 19 respectively which ride on a rail plate 21 disposed in the slot 20 and attached to the table 13 rigidly. The traveller 16 is vertically slotted to take and guide a lifting bar 22 which is so connected and operable through arms 96 and connector 97 as to raise and lower the lever 14 so that the recording stylus unit 23 inserted therein, will engage or disengage the periphery of a plastic recording cylinder 24. The bottom member 25 of the traveller extends at right angles to the vertical portion and has a slotted overhang 112 that slides on a slide rod 26. This slide rod 26 is longitudinally disposed under the table 13 and secured to the framework 27 and 113 mounted thereon. This framework 27 and 113 supports the various operable parts forming the mechanical structure of the dictating machine.

The lifting bar 22 is provided with two jaws, 28 and 29 respectively which are raised and lowered with it. When raised, the jaw 28 engages with a rotatable quick return screw 31 extending longitudinally across the framework 27 and 113. When lowered the jaw 29 engages with a rotatable slow feed screw 32 parallel to the return screw and spaced beneath, and likewise journalled in the framework. The jaw 29 is adjusted by screw 134 and tensioned by spring 135 supported on arm 136. A release mechanism 33 operates the lifting bar 22 to disengage the jaws 28 and 29 from screws 31 and 32 to release the carriage to a neutral position so it can be moved by hand.

This release mechanism consists of a manually operated push button 34 mounted on the table 13, which has a push rod 35 with a rack 36 thereon, that engages in a gear 30. The gear 30 is secured to a shaft 114 journalled in the framework 27 and 113, which supports a cam 37 aligned to actuate the lifting rod 22 and place the jaws 28 and 29 in neutral position, when the push button is operated. The push rod 35 is returned to operating position by spring 91.

The lifting bar is loaded or weighted by a loose solenoid 38 resting on a collar 39 adjustable thereon by means of a screw 41, provided on the underside of the bar. The solenoid is guided vertically on a rigid iron core stub 42 attached to the bottom member 25, so that when the current passes through the solenoid, the latter will raise itself up on the core stub 42 and relieve the bar 22 of its weight. The solenoid weighs about 7 ounces for a dictating machine of normal size. The lifting bar 22 normally rests in its down position with the jaw 29 in the feed screw 32. To raise it to engage the jaw 28 in the return screw 31, a solenoid 43 attached to the lifting bar 22 in a rigid manner is used. A core 44 attached to a bracket 45 supports a solenoid 43 which raises the lifting bar 22 when it is energized. The rollers 19 on the bracket 45 attached to the carriage are resiliently held in place on bell cranks 46 and held under tension by springs 47.

The recording stylus unit 23 is of conventional form obtainable commercially at the present time, and inserted in the front end of the lever 14 and held there frictionally. It has the usual contacts for operating it electrically, which in turn are coupled to electrical conductors that run to the microphones 87 and 73 that pick up the sounds to be recorded, and the usual electronic devices used for this type of device. This device is arranged for dual reception of sound, and by making it in the form indicated in Figure 1, it is held on the user like a telephone head set, in addition to the microphone 87.

The weight of the solenoid 38 is about 7 ounces for ordinary requirements and is so transmitted to the lifting bar 22 and recording lever 14 and stylus 23 as to cause the appropriate cutting pressure into the recording cylinder or material 24. This increased pressure is removed from the arm when the playback function is used, as it is not desired to dig into and wear the recording grooves to reproduce the sound therefrom.

The arrangement employed for operating the feed and return screws and incidental mechanism consists of a motor 51 mounted on the frame 113. It has a speed reducing gearing 52 connected to its shaft 53, and through a round belt 54 running over an idler 55 rotates a clutch pulley 56. A clutch 48 is slidably mounted on a shaft 90 and is thrown in and out of operative action by a shifter 57 actuated by an electrical arrangement consisting of a solenoid 58, and armature 59 against the tension of a coiled spring 60. Electrical conductors 61 run from this coil to a switch 62 convenient to the operator. The shaft 53 through the belt 54 and suitable gearing 63 rotates the feed screw 32, gears 92, the return screw 31 and a tapered mandrel head 64 for holding and turning the cylinder or recording sheet 24. The cylinder 24 is inserted in the machine underneath the table 13, by being placed in a carrier 65 of bent sheet material having a secondary tapered mandrel head 66 resiliently placed against the end plate 67. The carrier is trough shaped with flanges 68 on its upper open side serving to align with channels 69 through on the underside of the table 13. The mandrel 66 is adjustably positioned through the use of an axial adjusting screw 71 passing through the end plate 67 while a spring 72 gives it proper resiliency. This resiliency enables the cylinder 24 to be held properly when its installed between both mandrel heads 64 and 66. The carrier is readily pulled out horizontally and longitudinally from the table 13. When pushed in, its peripheral wall and end plate engage in notches 70 of the table and rigidly held in alignment.

The transmitter 49 is adapted for two-way conversational pick-up shown in Figure 1, and consists of a microphone unit 73 within a housing 74 having a series of holes or passages 75 in its walls to allow outside sounds to enter from various directions. The walls 76 are so extended that they can fit over a telephone instrument or other sound device to allow the sounds that are to be listened to by the operator as well as recorded by the machine to pass through holes 137. A cable 77 runs from the microphone to the remote control switching box and panel 78. A suitable cable 93 runs from the box 78 to the recorder unit in the machine proper, to provide the necessary recording and control of the parts previously described, for the operation and functioning of the whole device. The switching box 78 controls the operation of the various mechanisms and is usually positioned remotely from the cabinet. The switching box has individual switches, indicating lamps and volume controls, a microphone mounted thereon, and the parts are preferably arranged as follows: motor switch 79 and indicator light 120, amplifier switch 80 and indicator light 121, microphone selector switch 86, combined recording switch and needle pressure control 50 and meter 84, clutch switch 62, backspacer switch 85, playback switch 83, microphone 87, correction marker switch 94 and end of letter marking switch 95. The switching box 78 is connected to the cabinet 11 by a cable 93 and to microphone 73 by cable 77.

The diagram in Figure 9 shows a method of connecting up the electrical parts of the invention, and being developed from conventional circuits does not appear to require further description to those skilled in the art. The parts are as follows: motor switch 79, conductors 115, indicator light 120, and relay 116, amplification switch 80, conductors 117, indicator light 121 and relay 118, microphone selector switch 86, for connecting microphones 87 and 74 into the circuit through conductors 119 and 77, combined recording switch and needle pressure control 50, volume indicator 84 and conductors 120, clutch switch 62, conductors 61, and relay 58, backspacer switch 85, relay 43 and conductors 122, playback switch 83, conductors 124 and relay 123, unit 23, weighting solenoid 38 and conductors 125, correction marker switch 49, conductors 127 and relay 126, end of letter marking switch 95, conductors 128 and relay 126, indicator paper 129, correction markers 130, end of letter markers 131, power supply 132 and amplifier 133.

A correction device 89 is used for marking the locations on the cylinder at which corrections are to be. The device is of similar structure to that embodied in United States Patent Number 2,292,736 and therefore will not be described further herein. When the stylus unit 23 travels across the table its stylus or needle 103 passes through the opening or slot 88 in the table 13 provided for it to project through on and into the cylinder 24 and cut the recordings therein or reproduce same as desired. As the stylus unit 23 moves up and down the slot 88 it carries the correction 130 and end of letter mechanism 131 with it.

The motor rotates the feed and return screws through the gearing as indicated, at the same speed but in opposite directions. The threads on these screws are fine and coarse respectively to produce the necessary reactions in the jaws 18 and 19, and thereby make the traveller move quickly or slowly as the case may be. The push button 34 when pushed down provides a neutral position and is used for the purpose of disengaging the jaws from these screws and allow the traveller 66 and carriage 17 to be quickly moved by hand to any position on the table. The clutch 56 enables the screws to be disengaged from the motor 51 without stopping the latter. When the cylinder is filled up, it is removed by pulling on the end plate 67 and removing the whole trough carrier 65 with the secondary mandrel 66 holding the cylinder 24 thereon, until the flanges 68 are out of the channels 69. Then the cylinder is taken off the mandrel and lifted out of the carrier to be stored or reused.

In operation, the operator places a cylinder 24 in the carrier 65 and closes same, as the carrier closes, the cylinder 24 is raised upon the tapered head 64 and carrier 66 ready to receive the dictation.

Figures 14, 15:
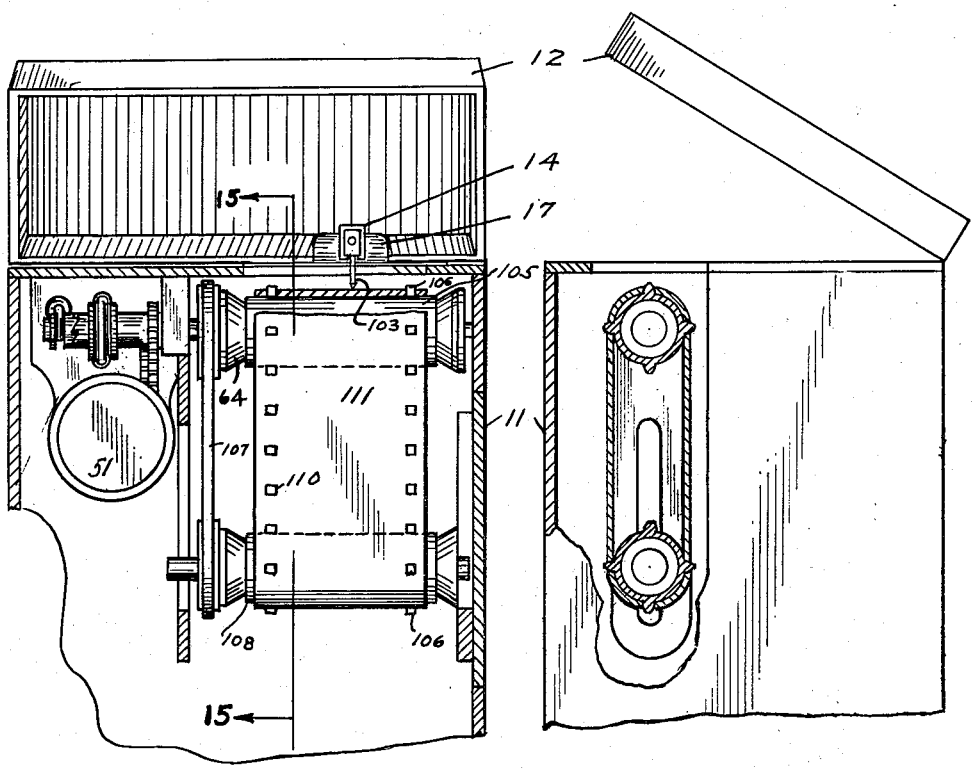
Figure 14 is a front elevation showing the modification using a film band instead of the cylinder and with parts broken away to show its construction.
Figure 15 is a side elevation of Figure 14 with parts of the cabinet broken away to show the mechanism along the lines 15—15 of Figure 14.

The motor 51 is started by switch 79, and lights indicator light 120. The amplification is then turned on through switch 80, lighting indicator lamp 121. The power meter 84 is adjusted by recording switch and volume control 50 until the proper power is indicated, the microphone selector switch 86 is set for microphone 87 and the machine is now ready to receive and record the message. The clutch switch 62 is turned on and rotates the cylinder 24 and the dictator talks into the microphone 87 until he has completed. During the dictation the operator may wish to note a correction that is to be made in the dictation, he accomplishes it by turning on switch 94 and turning it off again. The end of letter or dictation is noted by throwing switch 95. Should the dictator wish to listen to the recorded material he may do so by closing the back spacer switch 85 to move the carriage back to the point he wishes to listen to, opening the switch 85 stopping the backward travel of the carriage. The playback switch 83 is then closed, lifting the weighted solenoid 38 up off the lifting bar 22 and needle 103, this allows the recorded message to be placed back with less pressure between the needle and the cylinder than was present during the recording period. During the playback period the amplified reproduction is emitted from the loud speaker 104. In the event it is desired to record both sides of an important telephone conversation the switch 86 is moved to cut out the microphone 87 and connect the microphone 73 inserted in the housing 74 attached to the head band 102 into the circuit through cable 77 thence through the box 78 and impressed on the cylinder 24, in the usual manner. Should it be desired to record a long sermon, lecture or protracted conversation the cylinder 24 is replaced by a driving cylinder 105 having teeth 106 and belt 107 for operating the driven cylinder 108 which has teeth 109 which fit in the slots 110 of the recording belt 111 (see Fig. 14) and the message is impressed on its surface in the same manner as described for the cylinder 24.

While but two general forms of the invention is shown in the drawings and described in the specification, it is not desired to limit this application for patent to this particular form or in any other way otherwise than limited by the scope of the claims, as it is appreciated that other forms of construction could be made that would use the same principles and come within the scope of the appended claims.

Having thus described the invention what is claimed is:

1. A dictating machine comprising in combination a housing, recording and reproducing mechanism including a rotatable record, means for rotating the record, a mandrel for supporting one portion of said means mounted on said mechanism and operable therewith, a movable trough means including a support for another portion of said record means and enclosing the same therein so as to provide for the removal or placement of the means as a unit, said trough being slidably mounted in the housing in predetermined relation to the mechanism.

2. A dictating machine comprising in combination a housing, recording and reproducing mechanism including a rotatable record, means for rotating the record, a mandrel for supporting one portion of said means mounted on said mechanism and operable therewith, a movable trough means including a support for another portion of said record means and enclosing the same therein so as to provide for the removal or placement of the means as a unit, said trough being slidably mounted in the housing in predetermined relation to the mechanism, means for controlling the operation of the mechanism in predetermined sequence, and means for the reception of sound for transmission to said mechanism and first mentioned means.

3. A dictating machine comprising in combination a housing, recording and reproducing mechanism including a rotatable record, means for rotating the record, a mandrel for supporting one portion of said means mounted on said mechanism and operable therewith, a movable trough means including a support for another portion of said record means and enclosing the same therein so as to provide for the removal or placement of the means as a unit, said trough being slidably mounted in the housing in predetermined relation to the mechanism, means for controlling the operation of the mechanism in predetermined sequence, and means for the reception of sound for transmission to said mechanism and first mentioned means, and means for backspacing said mechanism for checking the recording made thereby.

4. A dictating machine comprising in combination a housing, recording and reproducing mechanism including a rotatable record, means for rotating the record, a mandrel for supporting one portion of said means mounted on said mechanism and operable therewith, a movable trough means including a support for another portion of said record means and enclosing the same therein so as to provide for the removal or placement of the means as a unit, said trough being slidably mounted in the housing in predetermined relation to the mechanism, means for controlling the operation of the mechanism in predetermined sequence, and means for the reception of sound for transmission to said mechanism and first mentioned means, means for backspacing said mechanism for checking the recording made thereby, and a magnetic adjustment of the stylus of said mechanism in predetermined degree to suit recording and reproduction in said mechanism.

5. A dictating machine comprising in combination a housing, recording and reproducing mechanism including a rotatable record, means for rotating the record, a mandrel for supporting one portion of said means mounted on said mechanism and operable therewith, a movable trough means including a support for another portion of said record means and enclosing the same therein so as to provide for the removal or placement of the means as a unit, said trough being slidably mounted in the housing in predetermined relation to the mechanism, means for controlling the operation of the mechanism in predetermined sequence, and means for the reception of sound for transmission to said mechanism and first mentioned means, means for backspacing said mechanism for checking the recording made thereby, a magnetic adjustment of the stylus of said mechanism in predetermined degree to suit recording and reproduction in said mechanism, said trough means being arranged whereby the record means can proceed in indefinite amounts of recording travel to said mechanism, and loudspeaker and microphonic means for accepting sounds for recording and the reproducing of same under predetermined control.

6. A dictating machine comprising in combination a housing, recording and reproducing mechanism including a rotatable record, means for rotating the record, a mandrel for supporting one portion of said means mounted on said mechanism and operable therewith, a movable trough means including a support for another portion of said record means and enclosing the same therein so as to provide for the removal or placement of the means as a unit, said trough being slidably mounted in the housing in predetermined relation to the mechanism, means for controlling the operation of the mechanism in predetermined sequence, and means for the reception of sound for transmission to said mechanism and first mentioned means, means for backspacing said mechanism for checking the recording made thereby, a magnetic adjustment of the stylus of said mechanism in predetermined degree to suit recording and reproduction in said mechanism, said trough means being arranged whereby the record means can proceed in indefinite amounts of recording travel to said mechanism and loudspeaker and microphonic means for accepting sounds for recording and the reproducing of same under predetermined control, said record means being of conventional material having its surface rendered suitable for recording.

7. A dictating machine comprising a framework, a recording and reproducing mechanism mounted and operable in the framework, a plurality of mandrels operable coordinately with said mechanism, a recording cylinder supported at the ends by said mandrels and in operable contact with said mechanism and means for enclosing and carrying said cylinder for placement or removal as a unit from said framework.

8. A dictating machine comprising a framework, a recording and reproducing mechanism mounted and operable in the framework, a plurality of mandrels operable coordinately with said mechanism, a recording cylinder supported at the ends by said mandrels and in operable contact with said mechanism means for enclosing and carrying said cylinder for placement or removal as a unit from said framework and correction means mounted on the framework for marking locations on said cylinder at which corrections are to be made.

9. A dictating machine comprising a recording and reproducing mechanism, means for driving the recording medium, a mandrel unit for supporting the recording medium and operable therewith, means for aligning the recording medium and placing same on said mandrels and removing same therefrom, means for controlling the operation of the mechanism, means for collecting various sounds and recording same on said recording medium, means for remotely backspacing said mechanism and playing back the recording for rechecking, magnetic adjustment of the stylus of said mechanism to reduce the needle pressure on the recording medium during the playback period, and electronic means for recording sounds on said recording medium and audibly reproducing them therefrom.

10. A dictating machine comprising a recording and reproducing mechanism, means for driving the recording belt medium, a mandrel unit for supporting the recording belt medium, and operable therewith, means for controlling the operation of the mechanism, means for collecting various sounds and recording same on said recording belt medium, additional means for picking up both sides of a telephone conversation and recording same on said recording belt medium, means for remotely backspacing said mechanism and playing back the recording for checking, magnetic adjustment of the stylus of said mechanism to reduce the needle pressure on the recording medium during the playback period, and electronic means for recording sounds on said belt medium and audibly reproducing said sounds therefrom.

11. A dictating machine comprising a recording and reproducing mechanism, means for driving the recording medium, a mandrel unit for supporting the recording medium and operable therewith, means for aligning the recording medium and placing same on the said mandrel and for the removal of same from said mandrel, means for controlling the operation of the mechanism, means for collecting various sounds and recording same on said recording medium, additional means for picking up two way telephone conversation and recording same on said recording medium, means for remotely backspacing said mechanism and playing back the recording for checking, magnetic adjustment of the stylus of said mechanism to reduce the needle pressure on the recording medium during the playback period, and electronic means for recording the sounds on said recording medium and audibly reproducing said sounds therefrom.

12. In a dictating machine, the combination of: a recording medium; a slidable self centering record holding trough, means for receiving sound and impulses and recording same on said recording medium, backspacing means for backchecking the sound and impulses impressed on said recording medium, a magnetic adjustment of the stylus of said recording mechanism to provide a predetermined variable amount of pressures to suit the recording and reproduction of said sounds and impulses, and trough means for catching and removing said recording medium from said dictating machine.

GERARD A. HARRINGTON.

REFERENCES CITED

The following references are of record in the file of this patent:

UNITED STATES PATENTS

| Number | Name | Date |
| --- | --- | --- |
| 2,113,141 | Huelich | Apr. 5, 1938 |
| 2,228,931 | Rysick | Jan. 14, 1941 |
| 2,268,645 | Dann | Jan. 6, 1942 |
| 2,277,207 | Chenoweth | Mar. 24, 1942 |
| 2,318,828 | Yerkovich | May 11, 1943 |
| 2,332,784 | DeSart, Sr. | Oct. 26, 1943 |
| 2,348,204 | Brubaker | May 9, 1944 |
| 2,382,607 | Clausen | Aug. 14, 1945 |